United States Patent [19]

Evans

[11] 4,248,157
[45] Feb. 3, 1981

[54] CONVEYOR TROLLEYS

[75] Inventor: Maurice Evans, Kalamazoo, Mich.

[73] Assignee: Aero-Motive Manufacturing Company, Kalamazoo, Mich.

[21] Appl. No.: 36,741

[22] Filed: May 7, 1979

[51] Int. Cl.³ .................................................. B61B 3/00
[52] U.S. Cl. ...................................... 105/154; 104/95; 104/246
[58] Field of Search ................... 104/89, 95, 118, 119, 104/245–247, 107, 109; 105/148, 153, 154

[56] References Cited

U.S. PATENT DOCUMENTS

| 874,367 | 12/1907 | Moore | 105/154 |
|---|---|---|---|
| 2,978,992 | 4/1961 | Wason | 104/95 X |
| 3,292,559 | 12/1966 | Cousins et al. | 104/246 |
| 3,550,535 | 12/1970 | Rooklyn | 104/118 |
| 3,971,601 | 7/1976 | Sytsma | 104/95 X |

FOREIGN PATENT DOCUMENTS 280210  2/1928  United Kingdom ..................... 105/154

Primary Examiner—Randolph A. Reese
Attorney, Agent, or Firm—Emrich, Root, Lee, Brown & Hill

[57] ABSTRACT

A conveyor trolley for transporting articles along an elongated supporting rail and embodying dielectric supporting and retaining wheels and bumpers constituted and arranged so as to effectively electrically insulate the trolley and the article to be transported from such a rail and from members, such as other trolleys or stop members, on said rail.

5 Claims, 4 Drawing Figures

CONVEYOR TROLLEYS

BACKGROUND OF THE INVENTION

This invention relates to conveyor trolleys and, more particularly, to conveyor trolleys that are particularly well adapted for transporting electrical equipment, such as, for example, welding equipment, and the like, along metal rails.

A primary objection of the present invention is to provide a novel conveyor trolley.

Another object of the present invention is to provide a novel conveyor trolley for transporting articles along a rail in electrically insulated relation to the rail.

Electrical equipment, such as, for example, welding equipment, is commonly supported by conveyor trolleys for movement along supporting rails from one part of a shop or factory to another, for use in suspended relation to the rail. Normally, it is desirable, if not essential, to electrically insulate such equipment from such supporting rails. This is particularly true with respect to welding equipment, and the like, because of the high voltages involved. In the past, such insulation commonly has been effected by interposing an insulated hanger bracket or insulating block between the trolley and the equipment. Such construction is undesirable for various reasons, including the expense involved in affording such construction, and the fact that such construction normally requires additional space which reduces usable head room, and the like. It is an important object of the present invention to overcome disadvantages heretofore known in the art in the insulation of conveyor trolleys and the articles carried thereby from the rails on which the trolleys run.

Another object of the present invention is to afford a novel conveyor trolley having wheels constituted and arranged in novel and expeditious manner for effectively electrically insulating the trolley and articles carried thereby from the rail on which the trolley runs.

Another object of the present invention is to afford a novel conveyor trolley of the aforementioned type wherein the wheels are effective to insure against the trolley moving in any direction effective to move it into non-insulated relation to the rail on which it runs.

Yet another object of the present invention is to afford a novel trolley of the aforementioned type which is effectively protected against accidental dislodgement, in any direction, from the rail on which it runs.

A further object is to provide a novel conveyor trolley of the aforementioned type which embodies structure effective to insulate the trolley and the article carried thereby from other objects, such as other trolleys or end stops, or the like, on the rail on which the trolley runs.

Another object of the present invention is to afford a novel conveyor trolley of the aforementioned type which is practical and efficient in operation, and which may be readily and economically produced commercially.

Other and further objects of the present invention will be apparent from the following description and claims and are illustrated in the accompanying drawings which, by way of illustration, show the preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE EMBODIMENT SHOWN HEREIN

Figure 1:
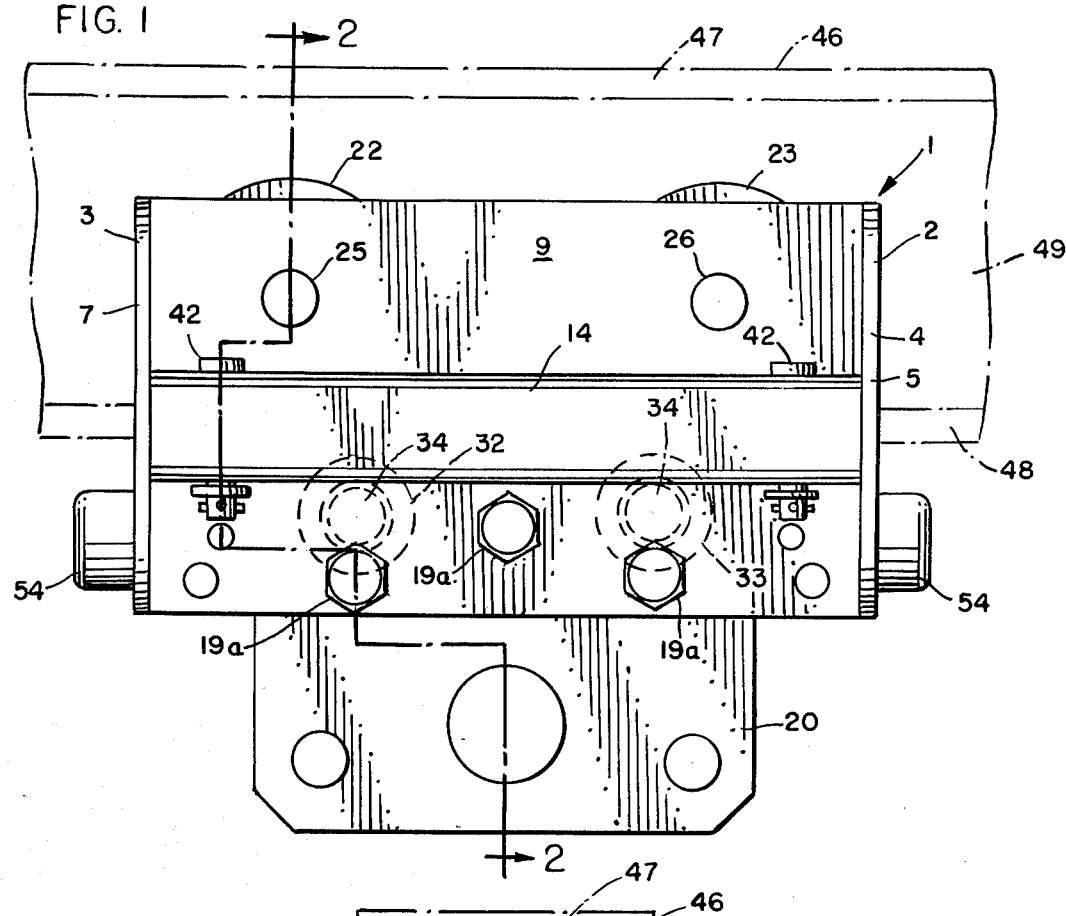
FIG. 1 is a side elevational view of a conveyor trolley embodying the principles of the invention, showing the trolley disposed in operative position on a supporting rail.

A conveyor trolley 1, embodying the principles of the present invention, is shown in the drawings to illustrate the presently preferred embodiment of the present invention.

The trolley 1 embodies a housing 2, which embodies two sections 3 and 4, which are mirror images of each other. The sections 3 and 4 embody a front wall 5 and 6, a rear wall 7 and 8, a sidewall 9 and 10 and a bottom wall 11 and 12, respectively. Each of the sidewalls 9 and 10 embodies a substantially vertically disposed upper portion 13, and a horizontally inwardly opening, substantially U-shaped channel 14 extending longitudinally along the bottom edge of the respective one of the upper portions 13 between the front wall 5-6 and the rear wall 7-8 of the housing 2. Each of the channels 14 embodies a top wall 15 and a bottom wall 16 disposed in substantially parallel relation to each other, and an outer wall 17 extending between the top wall 15 and the bottom wall 16, FIG. 2.

Figure 2:
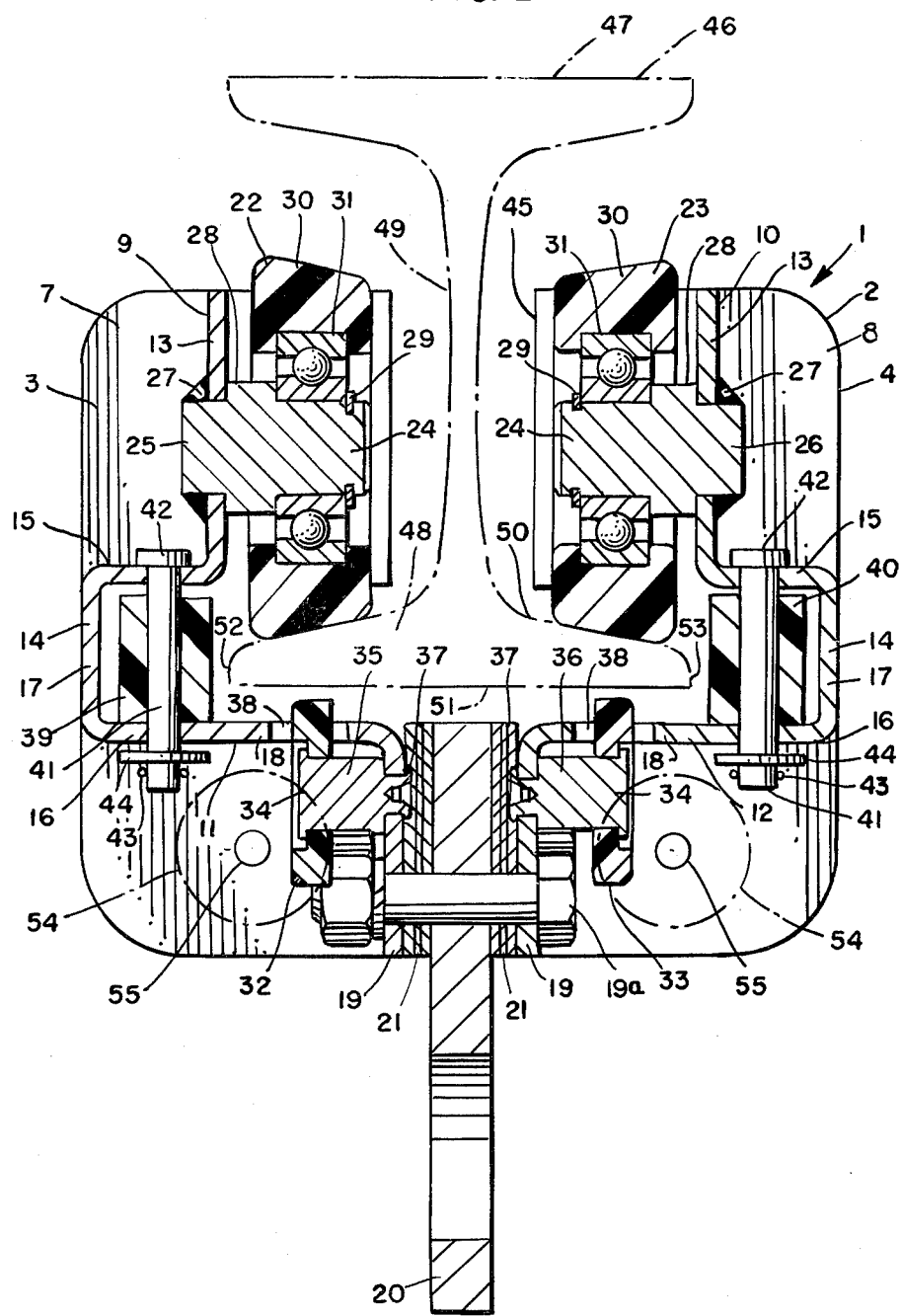
FIG. 2 is an enlarged detail sectional view taken substantially along the line 2—2 in FIG. 1.

Each of the bottom walls 11 and 12 embodies a substantially horizontally extending portion 18 disposed in uniplanar relation to the bottom walls 16 of the channels 14, and a flange projecting substantially vertically downwardly from the inner edge of the respective horizontal portion 18, FIG. 2. In the assembled trolley 1, the flanges 19 are disposed in parallel relation to each other.

The trolley 1 also embodies an article-carrying member in the form of a mounting plate 20. In the assembled trolley 1, the upper edge portion of the mounting plate 20 is disposed between the flanges 19, and is securely clamped between the latter by bolts 19a extending through the flanges 19 and the mounting plate 20. Preferably, suitable spacers 21 are disposed between the mounting plate 20 and the flanges 19, FIG. 2, for affording adjustment of the spacing of the flanges 19 relative to the mounting plate 20.

The housing 2, the mounting plate 20 and the spacers 21 may be made of any suitable material, but preferably are made of steel.

Two top wheels 22 and 23 are mounted on the inner end portions 24 of pins or shafts 25 and 26, mounted in and projecting inwardly from the sidewalls 9 and 10, respectively, FIG. 2. The shafts 25 and 26 may be made of any suitable material such as steel, and are secured to the respective sidewalls 9 and 10 by suitable means such as welding 27. The wheels 22 and 23 are retained in proper position on the shafts 25 and 26, respectively, by collars 28 and snap rings 29 disposed in spaced relation to each other on the inner end portions 24 of the shafts 25 and 26, FIG. 2. Each of the wheels 22 and 23 embodies an annular, outer peripheral portion 30 made of a suitable dielectric material, such as, for example, polyurethane, delran or rubber, or the like, and, preferably, each of the outer peripheral portions 30 is disposed on a suitable respective bearing, such as a roller bearing 31, as shown, in FIG. 2.

Two bottom wheels 32 and 33 are rotatably mounted on the outer end portions 34 of respective shafts 35 and 36 mounted in and projecting substantially horizontally outwardly from the flanges 19 of the bottom walls 11 and 12, respectively, FIG. 2. The shafts 35 and 36 may be made of any suitable material such as steel and preferably are non-rotatably mounted in the respective flanges 19, from which they project, by suitable means such as peening over the inner end portions 37 thereof.

The horizontal portion 18 of each of the bottom walls 11 and 12 has an opening 38 extending therethrough, and the shafts 35 and 36 are so disposed on the flanges 19 that the upper peripheral edge portions of the wheels 32 and 33 project upwardly through the openings 38 in the bottom walls 11 and 12, respectively, for a purpose which will be discussed in greater detail presently.

The wheels 32 and 33 are rotatably mounted on the shafts 35 and 36, respectively, and the outer peripheral portions, at least, are made of a suitable dielectric material, such as, for example, the aforementioned polyurethane, delran or rubber. Preferably, as shown in FIG. 2, the wheels 32 and 33 are solid in construction, and are constructed entirely of the aforementioned dielectric material.

Two side wheels or rollers 39 and 40 are rotatably mounted in the channels 14 of the sidewalls 9 and 10, respectively, FIG. 2. Each of the side wheels 39 and 40 is mounted on a shaft or pin 41, which extends through and is mounted in the top wall 15 and bottom wall 16 of the respective channel 14 in which the respective side wheel 39 or 40 is mounted. The pins 41 may be made of any suitable material such as steel, and preferably are substantially vertically disposed and are held in the respective channels 14 by suitable means such as an enlarged head 42 and a pin 43, with a suitable washer 44 being disposed between each of the pins 43 and the adjacent bottom wall 16 of the respective channel 14 in which the pin 41 is mounted.

The outer peripheral portions, at least, of each of the side wheels 39 and 40 is made of a suitable dielectric material, such as, for example, the aforementioned polyurethane, delran or rubber, and, preferably, the wheels 39 and 40 are solid in construction and made entirely of such dielectric material, as shown in FIG. 2. In the preferred form of the invention shown in the drawings, the wheels 39 and 40 are disposed on the respective shafts 41, on which they are mounted, with a snug fit, so that rotation of the wheels 39 and 40 around their vertical axes is effective to correspondingly rotate the respective shafts 41 on which they are mounted. The wheels 39 and 40 of the trolley 1 are disposed between, but horizontally, laterally outwardly of the top wheels 22-23 and the bottom wheels 32-33, for a purpose which will be discussed in greater detail presently.

Figure 3:
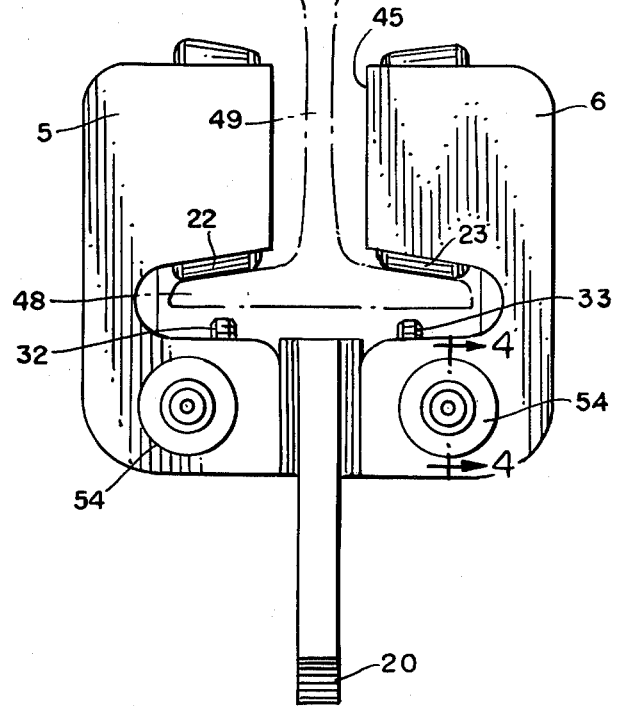
FIG. 3 is an end view of the conveyor trolley shown in FIG. 1.

The front walls 5-6 and the rear walls 7-8 of the assembled housing 2 each has an opening 45 extending therethrough, FIGS. 3 and 2, through which a rail extends when the trolley 1 is in operation. The trolley 1 is adapted to be mounted on a rail in the form of an I-beam, such as the I-beam 46 shown in broken lines in FIGS. 1-3. Such an I-beam, of course, embodies a top flange 47 and a bottom flange 48, disposed in substantially parallel relation to each other, with a vertical web 49 extending between the flanges 47 and 48 midway between the outer lateral edges thereof.

In the preferred form of the invention, the trolley 1 is intended to be mounted on and supported by the lower flange 48 of an I-beam, such as the I-beam 46, with the top wheels 22 and 23 resting on the upper surface 50 of the flange 48 on respective sides of the web 49, the bottom wheels 32 and 33 being disposed in closely adjacent, underlying relation to the lower surface 51 of the flange 48 in substantially radial alignment with the top wheels 22 and 23, respectively, and the side wheels 39 and 40 being disposed in closely adjacent, horizontally outwardly disposed relation to respective lateral edges 52 and 53 of the flange 48, as shown in FIG. 2. As a result, the openings 45 through the front wall 5-6 and the rear walls 7-8 of the housing 2 are of substantially inverted T-shape, to thereby accommodate the lower flange 48 and the lower portion of the web 49 of the I-beam 46, the upper flange 47 of the I-beam 46 being disposed in upwardly spaced relation to the trolley 1.

Preferably, the bottom wheels 32 and 33 and the side wheels 39 and 40 are so disposed relative to the top wheels 22 and 23 of the trolley 1 that, although they are disposed sufficiently close to the flange 48 of the I-beam 46 to prevent dislodgement of the trolley 1 from the lower flange 48, and to prevent any metal portion of the trolley 1, such as the housing 2 or the shafts on which the respective wheels are mounted, from moving into engagement with any part of the I-beam 46, they are normally disposed in spaced relation to the I-beam 46 so as to save wear on the wheels 32, 33, 39 and 40.

Figure 4:
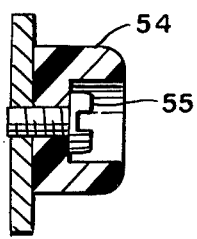
FIG. 4 is a detail sectional view taken substantially along the line 4—4 in FIG. 3.

Four bumpers 54 are mounted on the ends of the housing 2, each of the bumpers being mounted on a lower end portion of a respective one of the walls 5-8 by suitable means such as a screw or bolt 55, FIG. 4, disposed in inwardly spaced relation to the outer end of the respective bumper 54 and being threaded into the respective wall 5-8. The bumpers 54 may be made of any suitable dielectric material, such as, for example, the aforementioned polyurethane, delran or rubber, or the like. With this construction, if the trolley 1, while moving along the track 46 bumps into a stop at an end of the rail 46, or bumps into another trolley on the rail 46, the bumpers 54 are effective to prevent metal-to-metal contact between the trolley 1 and the object it has bumped into.

From the foregoing it will be seen that the present invention affords a novel conveyor trolley wherein the trolley, and articles carried thereby, are effectively electrically insulated from the rail on which the trolley runs, and are effectively electrically insulated from stops or other trolleys on the rail, which stops or trolleys the trolley might bump into during movement along the rail.

In addition, it will be seen that the present invention affords a novel, electrically insulated conveyor trolley which is practical and efficient in operation and which may be readily and economically produced commercially.

Thus, while I have illustrated and described the preferred embodiment of my present invention, it is to be understood that this is capable of variation and modification, and I therefore do not wish to be limited to the precise details set forth, but desire to avail myself of such changes and alterations as fall within the purview of the following claims.

What is claimed is:

1. A conveyor trolley for transporting articles longitudinally along an elongated, horizontally extending supporting rail having oppositely disposed upper and lower surfaces and oppositely disposed side surfaces, said trolley comprising
   a. a housing comprising
      (1) a front wall,
      (2) a rear wall,
      (3) two oppositely disposed side walls extending between and connecting said front and rear walls, and
      (4) a bottom wall extending substantially horizontally inwardly from each of said sidewalls and terminating in downwardly extending flanges,
   b. said front and rear walls having openings therethrough for the passage of such a rail through said housing during the movement of said trolley along said rail,
   c. two pairs of upper wheels,
   d. each of said pairs of upper wheels being
      (1) rotatably mounted on respective ones of said sidewalls, and
      (2) disposed in position to rest on laterally spaced, respective portions of said upper surface of such a rail,
   e. two pairs of side wheels
   f. each of said pairs of side wheels being
      (1) rotatably mounted on respective ones of said sidewalls, and
      (2) disposed in position to closely laterally overlie respective ones of said side surfaces,
   g. two pairs of lower wheels
   h. each of said pairs of lower wheels being
      (1) rotatably supported by one of said downwardly extending flanges on said bottom wall, and
      (2) projecting upwardly therefrom through an opening in said bottom wall in position to closely underlie laterally spaced respective portions of said lower surface of such a rail, and
   i. means projecting downwardly from said bottom wall for supporting such an article to be transported along such a rail,
   j. said wheels all having dielectric outer peripheral surfaces for electrically insulating said housing from such a rail.

2. A conveyor trolley as defined in claim 1, and in which
   a. said wheels in each of said pairs of wheels are spaced from each other between said front and rear walls in a direction to be spaced longitudinally of such a rail during movement of said trolley along said rail.

3. A conveyor trolley as defined in claim 2, and in which
   a. said pairs of side wheels are disposed laterally outwardly of said upper and lower wheels.

4. A conveyor trolley for transporting articles longitudinally along an elongated I-beam rail having a longitudinally extending central web, an upper flange disposed on top of said web and projecting laterally outwardly therefrom in opposite directions, and a lower flange disposed on the bottom of said web and projecting laterally outwardly therefrom in opposite directions, said trolley comprising
   a. a housing comprising two sections
   b. each of said sections comprising
      (1) a front wall,
      (2) a rear wall,
      (3) an outer side wall extending between and connecting said front and rear walls, and
      (4) a bottom wall,
   c. each of said bottom walls including
      (1) a horizontal portion projecting inwardly from said side wall of the respective one of said sections of which said bottom wall is a part, and
      (2) a flange projecting downwardly from the edge of said horizontal portion remote from said last mentioned side wall,
   d. a supporting member, for supporting such an article to be transported along such a rail, disposed between said flanges and projecting downwardly therefrom,
   e. means extending through said supporting member and said flanges for connecting said sections together and securing said supporting member to said housing,
   f. said front and rear walls having openings therethrough for the passage of such a rail through said housing during movement of said trolley along said rail,
   g. each of said side walls having an inwardly opening, elongated channel extending longitudinally thereof,
   h. two pairs of upper wheels,
   i. each of said pairs of upper wheels being
      (1) disposed in a respective one of said sections,
      (2) rotatably mounted on said side wall of said respective section, and
      (3) disposed in position to rest on the upper surface of said lower flange of such an I-beam on a respective side of said web of the latter,
   j. two pairs of side wheels,
   k. each of said pairs of side wheels being
      (1) disposed in a respective one of said sections,
      (2) rotatably mounted in said channel in said respective section, and
      (3) disposed in position to engage a respective outer longitudinal edge of said lower flange of said I-beam in position to prevent engagement of said respective section and said pair of upper wheels therein with said web of said I-beam, and
   l. two pairs of bottom wheels,
   m. each of said pairs of bottom wheels being
      (1) disposed in a respective one of said sections,
      (2) rotatably mounted on said flange of said bottom wall of said section and projecting upwardly through said horizontal portion of said last mentioned bottom wall, and
      (3) disposed in position to closely underlie the bottom surface of said bottom flange of such an I-beam for preventing dislodgement of said housing from said bottom flange of said I-beam,
   n. the outer peripheral portions of each of said wheels comprising dielectric material for insulating said housing and said supporting member from such an I-beam.

5. A conveyor trolley as defined in claim 4, and which includes
   a. bumpers mounted on said front and rear walls and projecting outwardly therefrom in the direction of movement of said housing along such a rail,
   b. the portions of said bumpers remote from said front and rear walls to which they are attached comprising dielectric material for electrically insulating said housing from articles engaged by said bumpers.

* * * * *